(12) United States Patent
Alrabady

(10) Patent No.: US 7,649,997 B2
(45) Date of Patent: Jan. 19, 2010

(54) USER TRANSPARENT REGISTRATION PROCESS FOR SECURE COMMUNICATION

(75) Inventor: Ansaf I. Alrabady, Livonia, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 631 days.

(21) Appl. No.: 10/897,969

(22) Filed: Jun. 30, 2004

(65) Prior Publication Data

US 2006/0003737 A1   Jan. 5, 2006

(51) Int. Cl.
  H04K 1/00 (2006.01)
  H04L 9/00 (2006.01)
  H04M 1/66 (2006.01)
  H04W 4/00 (2009.01)
  H04B 7/00 (2006.01)

(52) U.S. Cl. .............. 380/270; 380/247; 380/285; 455/41.2; 455/410; 455/435.1

(58) Field of Classification Search ............ 380/70, 380/248, 277, 270
  See application file for complete search history.

(56) References Cited

U.S. PATENT DOCUMENTS

| | | | | |
|---|---|---|---|---|
| 5,371,794 A | * | 12/1994 | Diffie et al. | 713/156 |
| 5,930,719 A | * | 7/1999 | Babitch et al. | 455/462 |
| 6,097,817 A | * | 8/2000 | Bilgic et al. | 380/270 |
| 6,694,143 B1 | * | 2/2004 | Beamish et al. | 455/456.1 |
| 6,757,262 B1 | * | 6/2004 | Weisshaar et al. | 370/310 |
| 6,944,762 B1 | * | 9/2005 | Garrison | 713/160 |
| 7,081,819 B2 | * | 7/2006 | Martinez de Velasco Cortina et al. | 340/572.7 |
| 7,123,721 B2 | * | 10/2006 | Panjwani et al. | 380/270 |
| 7,185,197 B2 | * | 2/2007 | Wrench, Jr. | 713/168 |
| 2004/0109567 A1 | * | 6/2004 | Yang et al. | 380/277 |
| 2004/0109568 A1 | | 6/2004 | Slick et al. | |
| 2004/0110472 A1 | * | 6/2004 | Witkowski et al. | 455/41.2 |
| 2004/0141603 A1 | * | 7/2004 | Bell | 379/167.03 |
| 2005/0090279 A9 | | 4/2005 | Witkowski et al. | |

OTHER PUBLICATIONS

Jain, Biometric Identification, Communications of the ACM, Feb. 2000, pp. 91-98.
International Search Report for PCT/US05/17595 dated Jun. 19, 2008.

\* cited by examiner

*Primary Examiner*—Nasser G Moazzami
*Assistant Examiner*—Fatoumata Traore

(57) ABSTRACT

A method for secure communication. The method includes receiving a request at a first device to communicate with a second device. The method also includes determining if an encryption key exists between the first device and the second device. Creation of the encryption key is initiated in response to a determination that that encryption key does not exist. The initiation of the creation of the encryption key occurs without user input. The method further includes communicating with the second device using the encryption key and performing user authentication of the communication.

18 Claims, 3 Drawing Sheets

USER TRANSPARENT REGISTRATION PROCESS FOR SECURE COMMUNICATION

BACKGROUND OF THE INVENTION

The present disclosure relates generally to communication between devices and in particular, to a method of providing a user transparent registration process for secure communication between two devices.

Hands-free systems that allow a driver of a vehicle to initiate and/or to receive cellular telephone calls by interacting with a vehicle interface are available in some newer vehicle models. The cellular telephone may be the driver's personal cellular telephone and not a cellular telephone only available to the driver when the driver is in the vehicle. Once communication is established between the vehicle and the cellular telephone, the driver of the vehicle can carry on a conversation with the other party using speakers and microphones located in the vehicle. The communication link between the vehicle and the cellular telephone is based on the bluetooth wireless standard and specification that manufacturers can build into their products. The bluetooth link allows the driver to use a speaker and microphone located in the vehicle to initiate or receive telephone calls to/from the driver's personal cellular telephone. The communication link between the cellular telephone and the telephone service provider occur in the same manner as if the driver was speaking directly into the personal cellular telephone.

From a security perspective, bluetooth provides two different modes of operation: secure mode and non-secure mode. The secure mode requires a registration process to take place prior to any communication. The registration process produces a shared secret encryption code that is stored in each device involved in the communication (e.g., a cellular telephone and a vehicle). The devices then use the shared secret encryption code as an encryption key to encrypt messages sent between the devices. The non-secure mode of operation does not require any registration to take place and hence does not provide any level of security. Bluetooth provides a wireless link which operates over public channels. Therefore, a hacker could listen to the channel, and if a message is not encrypted, the hacker could understand the content of the message.

Many people utilizing a hands-free system for communicating via their personal cellular telephones want to ensure that their conversations remain private and secure. If a user requires privacy and/or security a registration process should take place between the vehicle and the cellular telephone.

The current registration process is performed manually. The driver enters special codes into the cellular telephone and the vehicle to establish the shared secret encryption code. This is a tedious process and may not be easy for a user who is not a computer expert to perform. In addition, manual registration requires the vehicle to be equipped with a user interface in order for the user to enter the required code into the vehicle. Further, every time that the user uses a different vehicle (rental car, spouse vehicle, etc.) or has a new cellular telephone, the user has to perform the registration process.

BRIEF DESCRIPTION OF THE INVENTION

One aspect of the invention is a method for secure communication. The method includes receiving a request at a first device to communicate with a second device. The method also includes determining if an encryption key exists between the first device and the second device. Creation of the encryption key is initiated in response to a determination that that encryption key does not exist. The initiation of the creation of the encryption key occurs without user input. The method further includes communicating with the second device using the encryption key and performing user authentication of the communication.

In another aspect, a system for secure communication includes a first device connected via a network to a second device. The first device includes instructions to implement a method. The method includes receiving a request at the first device to communicate with a second device. The method also includes determining if an encryption key exists between the first device and the second device. Creation of the encryption key is initiated in response to a determination that that encryption key does not exist. The initiation of the creation of the encryption key occurs without user input. The method further includes communicating with the second device via the network using the encryption key and performing user authentication of the communication.

In a further aspect, a computer program product for secure communication comprises a storage medium readable by a processing circuit and storing instructions for execution by the processing circuit for performing a method. The method includes receiving a request at a first device to communicate with a second device. The method also includes determining if an encryption key exists between the first device and the second device. Creation of the encryption key is initiated in response to a determination that that encryption key does not exist. The initiation of the creation of the encryption key occurs without user input. The method further includes communicating with the second device using the encryption key and performing user authentication of the communication.

BRIEF DESCRIPTION OF THE DRAWINGS

Referring to the exemplary drawings wherein like elements are numbered alike in the several FIGURES.

DETAILED DESCRIPTION OF THE INVENTION

Figure 1:
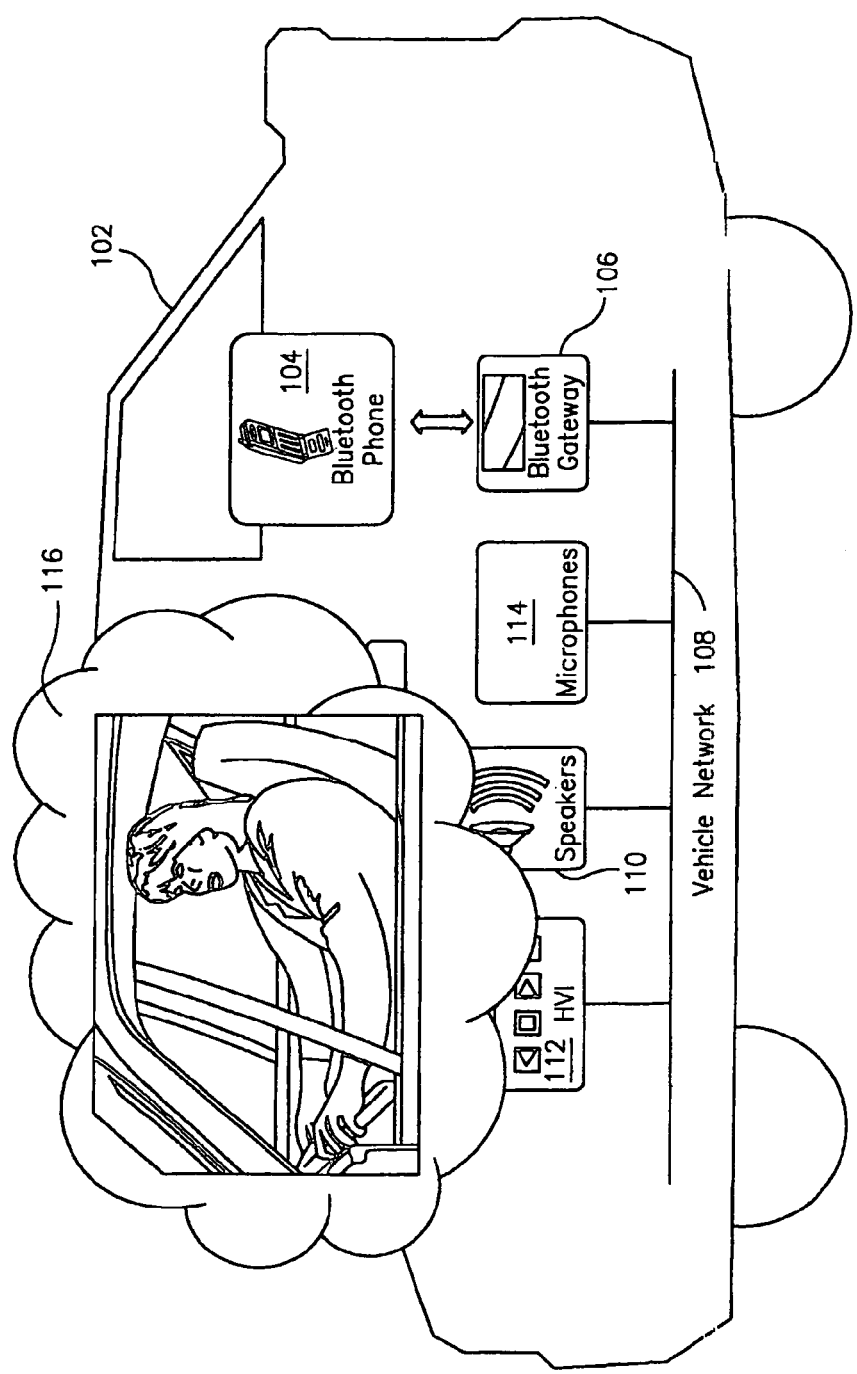
FIG. 1 is a block diagram of an exemplary system for a user transparent registration process for secure communication.

FIG. 1 is a block diagram of an exemplary system for a user transparent registration process for secure communication. A driver 116 who has a personal cellular telephone 104 is located in the vehicle 102. The vehicle 102 includes a vehicle network 108 connected to a communication link 106, to one or more speakers 110, to one or more microphones 114, and to a human vehicle interface (HVI) 112. In an exemplary embodiment of the present invention, when the driver 116 gets into the vehicle with a cellular telephone 104, the vehicle detects the presence of the cellular telephone 104. The vehicle 102, via the communication link 106, then initiates communication with the cellular telephone 104 to create an encryption key that is applied to messages between the vehicle 102 and the cellular telephone 104. Then, when calls are received on the cellular telephone 104, they are routed to the HVI 112. In addition, the driver 116 can initiate calls via the HVI 112. In an alternate exemplary embodiment of the present invention, the encryption key is created when the driver 116 initiates a telephone call via the HVI 112 or receives a telephone call to the cellular telephone 104. The cellular telephone 104 continues to communicate with the cellular telephone provider (e.g., via cellular towers) in the same manner as it does when the cellular telephone 104 is utilized outside of the vehicle 102.

The communication link 106 in the vehicle 102 provides a communication path between the cellular telephone 104 and the vehicle network 108. The vehicle network 108 provides a communication path to the HVI 112, the speakers 110 and the microphones 114. In a typical scenario, the driver 116 of the vehicle 102 is notified by the HVI 112 (e.g., via a ring tone) that an incoming call has arrived. The HVI 112 notification is triggered when a radio frequency message is sent from the cellular telephone 104 to the communication link 106. The driver 116 presses a button on the HVI 112 and the incoming communication can be heard over the speakers 110. The driver 116 utilizes the microphones 114 and the speakers 110 to carry on a conversation with the calling/called party. Information received by the microphone 114 is sent via the vehicle network 108 to the communication link 106 and then back to the cellular telephone 104. The cellular telephone takes the information and transmits it to cellular towers in the same manner that it would transmit the information if the driver 116 was talking directly into the cellular telephone 104.

Figure 2:
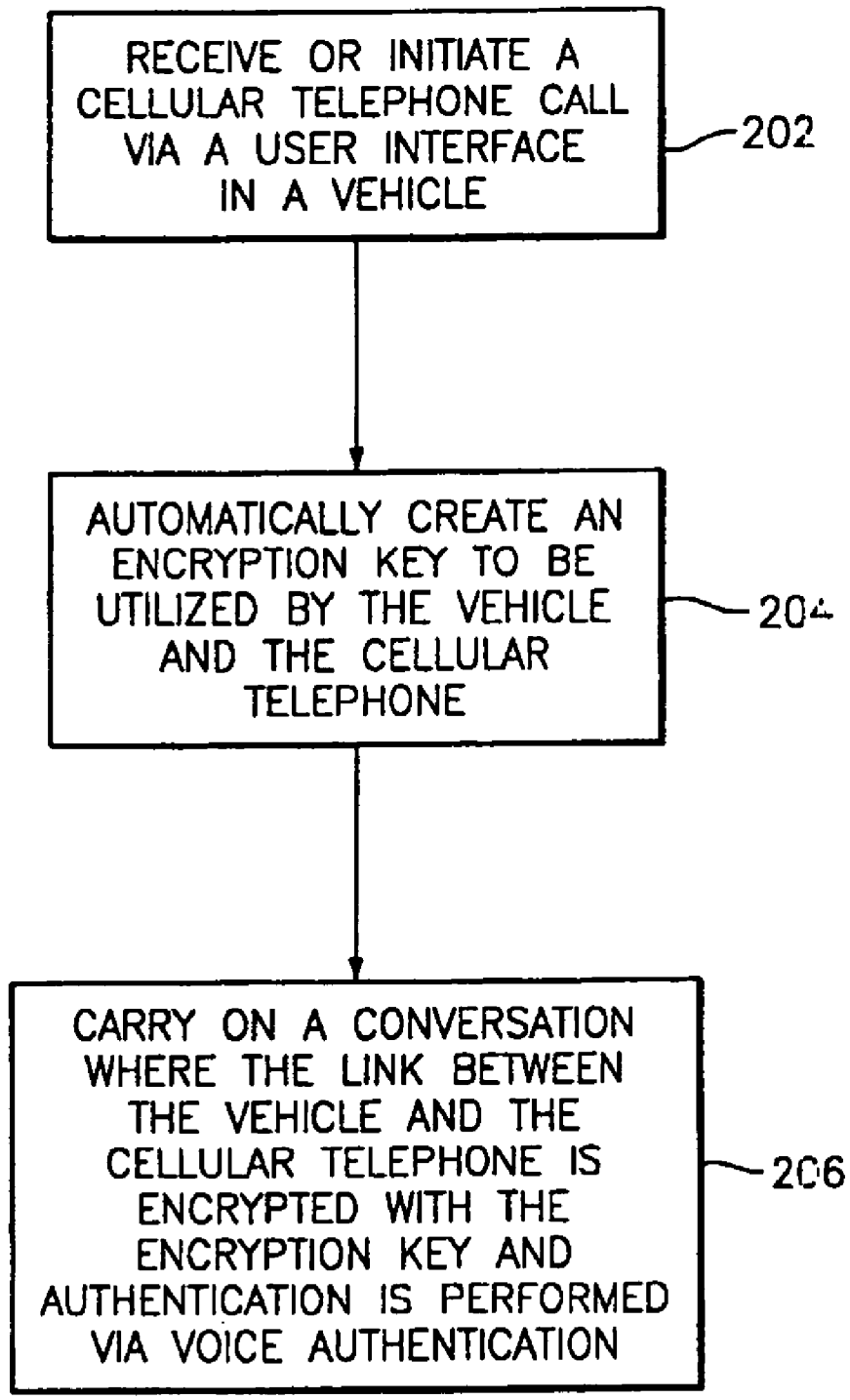
FIG. 2 is a process flow that is implemented by exemplary embodiments of the present invention.

FIG. 2 is a process flow that is implemented by exemplary embodiments of the present invention. At 202, a cellular telephone call is received or initiated by the driver 116 of a vehicle 102. The cellular telephone call is received or initiated via the HVI 112 in the vehicle 102. The HVI 112 provides an interface to a hands-free telephone service to the driver 116 of the vehicle 102. At 204, a registration process is performed, including an encryption key being automatically created by both the cellular telephone 104 and the vehicle 102. Both the cellular telephone 104 and the vehicle 102 utilize the same key exchange protocol algorithms (e.g., a Diffi-Hellman key exchange protocol algorithm) to each create a copy of the encryption key. This process is described further in reference to FIG. 3 below. The encryption key is utilized to encrypt and decrypt messages that are transferred between the cellular telephone 104 and the vehicle 102 in order to provide for private conversations. The initiation and actual creation of the encryption keys are performed automatically (i.e., without user input) the first time that communication is attempted between the cellular telephone 104 and the vehicle 102 (i.e., when no encryption key already exists between the cellular telephone 104 and the vehicle 102).

Alternatively, 204 is initiated in response to the cellular telephone 104 being detected in the vehicle 102. For example, a bluetooth cellular telephone 104 may be detected by a bluetooth gateway communication link 106 located in the vehicle 102. Once the detection occurs, 204 may be executed to create an encryption key on the vehicle 102 and the cellular telephone 104. Then, when an incoming call is received, it is routed to the HVI 112 and when an outgoing call is placed, it is placed via the HVI 112.

At 206, the driver 116 of the vehicle 102 carries on a conversation via the hands-free telephone service. Authentication is performed via voice authentication. In other exemplary embodiments of the present invention, user authentication may be performed by other non-cryptology means such as visual authentication.

The communication link 106 between the vehicle 102 and the cellular telephone 104 is encrypted and decrypted using the encryption key. In exemplary embodiments of the present invention, the communication link 106 is provided via a wireless bluetooth gateway. Alternative exemplary embodiments of the present invention may utilize any short range communication protocol such as 802.11. In order to communicate with each other, both the cellular telephone 104 and the vehicle 102 will need to include the same or compatible short range communication protocols.

A variety of key exchange protocols are known in the art. However, the key-exchange protocols are not commonly used due to their weakness in protecting against threats such as man-in-the-middle attacks. For example, when the vehicle 102 receives the cellular telephone public key 306, it does not really know whether it is actually the cellular telephone's 104 key or another device claiming to be the cellular telephone 104. To solve this problem, a trusted third party is typically used as a mediator to facilitate the trust between the two devices. Exemplary embodiments of the present invention utilize the key exchange protocol to provide privacy without the need for a trusted third party because user authentication, such as voice authentication, is utilized to provide authentication.

Figure 3:
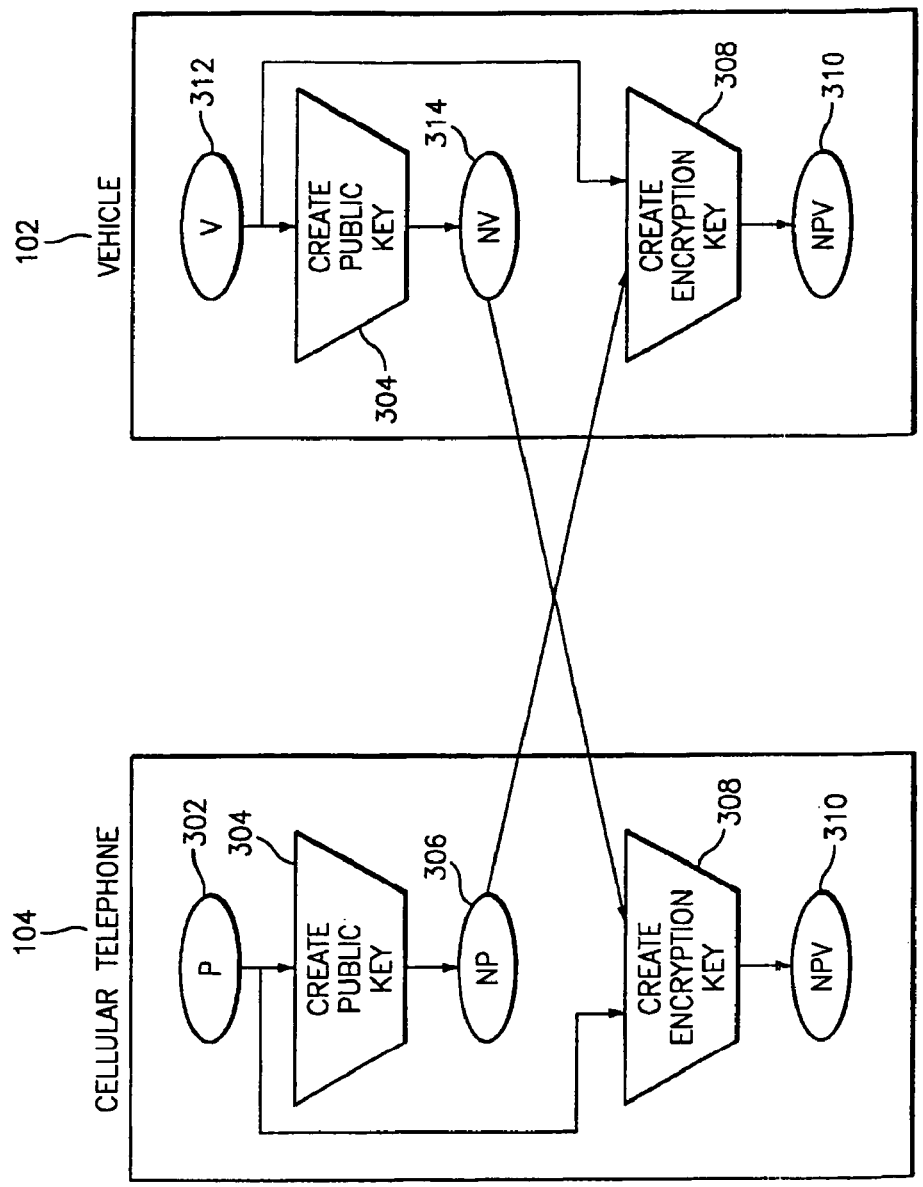
FIG. 3 is an exemplary key-exchange protocol that is utilized by exemplary embodiments of the present invention.

FIG. 3 is an exemplary key-exchange protocol that is utilized by exemplary embodiments of the present invention. The key-exchange protocol is utilized to establish a shared secret encryption code between two entities without any prior arrangement or communication between them. Generally speaking, a key exchange protocol between two entities, such as a cellular telephone 104 and a vehicle 102 works as follows: the cellular telephone 104 picks a number, referred to herein as a cellular telephone private key 302. The cellular telephone 104 then executes a create public key algorithm 304 to create a cellular telephone public key 306 from the cellular telephone private key 302. The create public key algorithm 304 is designed to be mathematically difficult to reverse. Similarly, the vehicle 102 also selects a number, referred to herein as a vehicle private key 312 and executes the create public key algorithm 304 to create a vehicle public key 314. The vehicle private key 312 is selected by the vehicle 102 independently of the cellular telephone private key 302.

The cellular telephone public key 306 is sent to the vehicle 102 and the vehicle public key 314 is sent to the cellular telephone 104. Based on the cellular telephone private key 302 and the vehicle public key 314, a create encryption key algorithm 308 located on the cellular telephone 104 is executed to create an encryption key 310. Similarly, using the vehicle private key 312 and the cellular telephone public key 306 as input, the create encryption key algorithm 308 located on the vehicle 102 is executed to create the same encryption key 310 created by the create encryption key algorithm 308 located on the cellular telephone 104. In this manner, the same encryption key 310 is created on both the cellular telephone 104 and the vehicle 102. Privacy is provided by encrypting and decrypting messages sent between the cellular telephone 104 and the vehicle 102 using the encryption key 310.

Copies of the create encryption key algorithm 308 and the create public key algorithm 304 are stored on microprocessors located in the cellular telephone 104 and the vehicle 102. Alternatively, the create encryption key algorithm 308 and the create public key algorithm 304 may be located on a remote processor and accessed via a network (e.g., an Internet). The algorithms and communication protocols described herein may be built into the devices during manufacture or they may be installed (e.g., via the Internet) at a later date.

Exemplary embodiments of the present invention utilize a key-exchange protocol for providing private communication between two devices, without the need for a trusted third party. A registration process that is transparent to the user is performed to create the shared secret encryption code (i.e., the encryption key) between the two devices. This is possible in applications where user authentication can be performed (e.g., by visual means and audio means). When people talk over the telephone, user authentication is performed when either they recognized each other by voice or because they have a common subject to talk about. Because the key-exchange protocol is a one-to-one protocol, only one of three links can be established at any time with the presence of a hacker. The first is between the hacker and the vehicle (in this case the hacker is talking to the driver), the second is between the hacker and the cellular telephone (in this case the hacker is talking to the person on the other end of the line), and third is between the vehicle and the cellular telephone. The private conversation between the driver and the other person (the third link) is protected as only one link can be established at a time.

Exemplary embodiments of the present invention are not likely to be vulnerable to a hacker establishing two independent one-to-one links (i.e., the man-in-the-middle attack). The first link is between the cellular telephone 104 and the hacker, the second link is between the hacker and the vehicle 102. While this may occur on the Internet, it is not possible for the man-in-the-middle attack to be successful when utilizing exemplary embodiments of the present invention. The communication between the vehicle 102 and cellular telephone 104 is wireless, and the vehicle 102 and cellular telephone 104 are within a relatively close proximity of each other. Further, the communication is taking place in real time. The fact that the communication is taking place in real time provides a mechanism for the communicating parties to notice any delay introduced by the hacker. The fact the communication is wireless makes it impossible for the hacker to ensure that his possessed signal will be received correctly by one end, while at the same time and on the same channel the other end is transmitting.

Alternate exemplary embodiments of the present invention include support for a user transparent registration process for secure communication (e.g., within a house or office) between a cordless telephone base and a cordless telephone handset and/or headset. This allows a base from one manufacturer to be utilized with handsets and/or headsets from other manufacturers. Other devices communicating within a relatively short range may implement the registration process described herein. Other examples include an intercom system and walkie talkies. Further, embodiments of the present invention are not limited to the driver of the vehicle 102 but may also be expanded to include occupants of the vehicle 102.

A registration process that is transparent to the user and at the same time ensures privacy between two devices, such as a vehicle and a cellular telephone, is provided by exemplary embodiments of the present invention. A user transparent registration process to establish a shared secret encryption code (or encryption key) between two devices that need to communicate but that have not communicated previously is automatically initiated. The transparent registration process is performed by a key exchange protocol. A private link is established between the two devices. By utilizing a transparent registration process, a cellular telephone user can easily move from vehicle to vehicle without having to manually register each time with the new vehicle. The user does not need to remember pin codes nor does the user have to learn how to perform a manual registration process.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for secure communication, the method comprising:
    detecting a first device in proximity to a second device, wherein the detecting is performed using a gateway communication link;
    receiving a request at the first device to communicate with the second device to establish an audio conversation between a plurality of users;
    automatically performing a registration process using a key exchange protocol in response to receiving the request, the registration process comprising:
        determining existence of an encryption key between the first device and the second device; and
        initiating creation of the encryption key in response to a determination that the encryption key does not exist, the initiating occurring without user input, and wherein the creation includes:
            at each of the first device and the second device, generating a unique public key, exchanging the unique public keys, and creating an encryption key based on the exchanged unique public key;
    communicating with the second device using the encryption key to secure the audio conversation;
    wherein the first device is a vehicle and the second device is a telephone, the first device and second device communicating via wireless link, and further wherein the gateway communication link is interfaced to a human-vehicle interface (HVI) over a vehicle network, the HVI enabling one of the plurality of users to initiate the request; and
    performing user authentication of the communication.

2. The method of claim 1 wherein the initiating includes:
    transmitting a command to the second device, the command including instructions to create the encryption key on the second device; and
    executing a command on the first device, the command including instructions to create the encryption key on the first device.

3. The method of claim 1 wherein the creation further includes:

transmitting a request for a second device public key to the second device;
receiving the second device public key from the second device; and
creating the encryption key in response to a first device private key and the second device public key, wherein the first device private key is selected independently of a second device private key.

4. The method of claim 3 wherein the creation further includes:
creating a first device public key responsive to the first device private key; and
transmitting the first device public key to the second device.

5. The method of claim 1 wherein the first device and the second device utilize mathematically related algorithms.

6. The method of claim 1 wherein the first device is a Bluetooth enabled cellular telephone.

7. The method of claim 1 wherein the request is received from a driver of a vehicle.

8. The method of claim 1 wherein the request is received from the first device or the second device.

9. The method of claim 1 wherein the user authentication is voice authentication.

10. The method of claim 1 wherein the conversation further includes visual content and the user authentication is visual authentication.

11. The method of claim 1 wherein the communicating includes using the encryption key to encrypt a message being sent to the second device.

12. The method of claim 1 wherein the communicating includes using the encryption key to decrypt a message being received from the second device.

13. A system for secure communication, the system comprising:
a first device connected via a network to a second device, the first device including instructions to implement a method comprising:
detecting the first device in proximity to the second device, wherein the detecting is performed using a gateway communication link;
receiving a request at the first device to communicate with the second device to establish an audio conversation between a plurality of users;
automatically performing a registration process using a key exchange protocol in response to receiving the request, the registration process comprising:
determining existence of an encryption key between the first device and the second device; and
initiating creation of the encryption key in response to a determination that the encryption key does not exist, the initiating occurring without user input, and wherein the creation includes:
at each of the first device and the second device, generating a unique public key, exchanging the unique public keys, and creating an encryption key based on the exchanged unique public key;
communicating with the second device using the encryption key to secure the audio conversation;
wherein the first device is a vehicle and the second device is a telephone, the first device and second device communicating via wireless link, and further wherein the gateway communication link is interfaced to a human-vehicle interface (HVI) over a vehicle network, the HVI enabling one of the plurality of users to initiate the request; and
performing user authentication of the communication.

14. The system of claim 13 wherein the network is a bluetooth network.

15. The system of claim 13 wherein the network is a local area network.

16. The system of claim 13 wherein the network is a short range communication network.

17. A computer program product for secure communication, the computer program product comprising:
a storage medium readable by a processing circuit and storing instructions for execution by the processing circuit for performing a method comprising:
detecting a first device in proximity to a second device, wherein the detecting is performed using a gateway communication link;
receiving a request at the first device to communicate with the second device to establish an audio conversation between a plurality of users;
automatically performing a registration process using a key exchange protocol in response to receiving the request, the registration process comprising:
determining existence of an encryption key between the first device and the second device; and
initiating creation of the encryption key in response to a determination that the encryption key does not exist, the initiating occurring without user input, and wherein the creation includes:
at each of the first device and the second device, generating a unique public key, exchanging the unique public keys, and creating an encryption key based on the exchanged unique public key;
communicating with the second device using the encryption key to secure the audio conversation;
wherein the first device is a vehicle and the second device is a telephone, the first device and second device communicating via wireless link, and further wherein the gateway communication link is interfaced to a human-vehicle interface (HVI) over a vehicle network, the HVI enabling one of the plurality of users to initiate the request; and
performing user authentication of the communication.

18. A method for secure communication, the method comprising:
receiving a request at a human vehicle interface (HVI) to communicate between a vehicle and a cellular telephone to establish an audio conversation between a plurality of users, wherein the request is one of an initiated call and a received call;
automatically performing a registration process using a key exchange protocol in response to receiving the request, the registration process comprising:
determining existence of an encryption key between the vehicle and the cellular telephone; and
initiating creation of the encryption key in response to a determination that the encryption key does not exist, the initiating occurring without user input, and wherein the creation includes:
at each of the vehicle and the cellular telephone, generating a unique public key, exchanging the unique public keys, and creating an encryption key based on the exchanged unique public key;
communicating with the cellular telephone using the encryption key to secure the audio conversation; and
wherein the vehicle and the cellular telephone communicating via wireless link, and
performing user authentication of the communication.

* * * * *